US010528648B2

(12) United States Patent
Asai

(10) Patent No.: US 10,528,648 B2
(45) Date of Patent: *Jan. 7, 2020

(54) COMPUTER READABLE RECORDING MEDIUM, INFORMATION PROCESSING TERMINAL DEVICE, AND CONTROL METHOD OF INFORMATION PROCESSING TERMINAL DEVICE

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,451

(22) Filed: Nov. 6, 2018

(65) Prior Publication Data

US 2019/0073341 A1 Mar. 7, 2019

Related U.S. Application Data

(63) Continuation of application No. 14/340,922, filed on Jul. 25, 2014, now Pat. No. 10,146,744, which is a
(Continued)

(30) Foreign Application Priority Data

Mar. 25, 2011 (JP) .................................. 2011-068690

(51) Int. Cl.
*G06F 17/21* (2006.01)
*G09G 5/00* (2006.01)
*H04N 1/00* (2006.01)

(52) U.S. Cl.
CPC ............. *G06F 17/212* (2013.01); *G09G 5/00* (2013.01); *H04N 1/00392* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

2004/0157647 A1  8/2004  Takahashi
2004/0239792 A1  12/2004  Shibutani et al.
(Continued)

FOREIGN PATENT DOCUMENTS

JP    H10-027081 A    1/1998
JP    2004-145291 A    5/2004
(Continued)

OTHER PUBLICATIONS

Japan Patent Office, Notification of Reasons for Refusal issued in Japanese Patent Application No. 2011-068690, dated Mar. 12, 2013.

*Primary Examiner* — Yi Wang
(74) *Attorney, Agent, or Firm* — Baker Botts L.L.P.

(57) ABSTRACT

An information processing terminal device includes: an acquiring unit acquiring image data; a detecting unit detecting a posture of the information processing terminal device; a generating unit generating display image data based on the image data acquired in the acquiring unit according to the posture of the terminal device detected by the detecting unit; and a displaying unit displaying the display image data generated by the generating unit on a display unit. If the posture of the terminal device is changed, the generating unit generates the display image data according to the changed posture of the terminal device. If the posture of the terminal device is changed during the generation of the image data by the generating unit, the generating unit does not generate the
(Continued)

display image data according to the changed posture of the terminal device, until the generation of the display image data is completed.

20 Claims, 10 Drawing Sheets

Related U.S. Application Data continuation of application No. 13/359,317, filed on Jan. 26, 2012, now Pat. No. 8,830,261.

(56) References Cited

U.S. PATENT DOCUMENTS

| | | |
|---|---|---|
| 2005/0041147 A1 | 2/2005 | Kim et al. |
| 2005/0152002 A1 | 7/2005 | Shirakawa et al. |
| 2007/0047943 A1 | 3/2007 | Seo et al. |
| 2008/0151294 A1 | 6/2008 | Natori et al. |
| 2008/0231871 A1 | 9/2008 | Nelson et al. |
| 2008/0259095 A1 | 10/2008 | Dubs et al. |
| 2009/0002391 A1 | 1/2009 | Williamson et al. |
| 2009/0059305 A1 | 3/2009 | Ricard |
| 2011/0222087 A1 | 9/2011 | Gelphman |
| 2012/0057064 A1 | 3/2012 | Gardiner et al. |

FOREIGN PATENT DOCUMENTS

| | | |
|---|---|---|
| JP | 2004-240878 A | 8/2004 |
| JP | 2006-211378 A | 8/2006 |
| JP | 2008-131616 A | 6/2008 |
| JP | 2008-269603 A | 11/2008 |

DIRECTION OF GRAVITATIONAL FORCE

DIRECTION OF GRAVITATIONAL FORCE

FIG. 6

| IDENTIFICATION NUMBER | FIRST FILE PATH | SECOND FILE PATH | VERTICAL PRINT PREVIEW DISPLAY IMAGE DATA FLAG | THIRD FILE PATH | HORIZONTAL PRINT PREVIEW DISPLAY IMAGE DATA FLAG |
|---|---|---|---|---|---|
| 300 | 301 | 302 | 303 | 304 | 305 / TB1 |
| 1 | Sdcard/A.jpg | Sdcard/1.jpg | EXISTENCE | — | NON-EXISTENCE |
| 2 | Sdcard/B.jpg | Sdcard/2.jpg | EXISTENCE | Sdcard/12.jpg | EXISTENCE |
| 3 | Sdcard/C.jpg | — | NON-EXISTENCE | — | NON-EXISTENCE |
| ... | ... | ... | ... | ... | ... |

COMPUTER READABLE RECORDING MEDIUM, INFORMATION PROCESSING TERMINAL DEVICE, AND CONTROL METHOD OF INFORMATION PROCESSING TERMINAL DEVICE

CROSS-REFERENCE TO RELATED APPLICATIONS

This application is a continuation of U.S. patent application Ser. No. 14/340,922 filed on Jul. 25, 2014, which is a continuation of U.S. patent application Ser. No. 13/359,317 filed on Jan. 26, 2012, which claims the benefit of priority of Japanese Patent Application No. 2011-068690 filed on Mar. 25, 2011, the disclosures of each of which are incorporated herein by reference in their entirety.

BACKGROUND

The present disclosure relates to an image processing program, an information processing terminal device, and a control method of the information processing terminal device.

An apparatus of a related art rotates a current display image according to rotation of a housing. In a case where the rotation of the housing is detected, a conversion on coordinates according to the rotation is performed. Then, on the basis of the converted coordinates, rotated image data is displayed on a display unit.

SUMMARY

For example, in a case of processing a large amount of data should be processed for displaying image data on the display unit (such as a case where the amount of image data is large or a case of processing data of a plurality of images), the process takes a long time until the rotated image data according to the rotation of the housing is displayed. In this case, if a user unintentionally changes the direction of the housing during an image-data display process, another image data displaying process according to the changed direction of the housing may be performed. In this case, for example, a situation in which the apparatus does not receive a user's manipulation until a display process is completed may occur. Therefore, the user-friendliness is bad. One of aspects of the present disclosure was made considering the above-mentioned problem, and an object of one of the aspects of the present disclosure is to improve operability in a case of displaying image data.

The one of aspects of the present disclosure provides the following arrangements:

An information processing terminal device comprising:
an acquiring unit configured to acquire image data;
a detecting unit configured to detect a posture of the information processing terminal device;
a generating unit configured to generate display image data based on the image data acquired in the acquiring unit according to the posture of the information processing terminal device detected by the detecting unit; and
a displaying unit configured to display the display image data generated by the generating unit on a display unit,
wherein, if the posture of the information processing terminal device is changed, the generating unit generates the display image data according to the changed posture of the information processing terminal device, and
if the posture of the information processing terminal device is changed during the generation of the image data by the generating unit, the generating unit does not generate the display image data according to the changed posture of the information processing terminal device, until the generation of the display image data is completed.

A non-transitory computer readable recording medium storing an image processing program to be executed by a computer of an information processing terminal device including a first acquiring unit, a second acquiring unit and a display unit, the information processing program comprising:
an acquisition control instruction that causes the first acquiring unit to acquire image data;
a generation control instruction that causes the computer to generate display image data based on the image data acquired by the acquisition control instruction according to a posture of the information processing terminal device acquired by the second acquiring unit; and
a display control instruction that causes the display unit to display the display image data generated by the generating unit,
wherein, if the posture of the information processing terminal device is changed, the generation control instruction causes the generating unit to generate the display image data according to the changed posture of the information processing terminal device, and
if the posture of the information processing terminal device is changed during the generation of the display image data by the generating control instruction, the generation control instruction does not causes the computer to generate the display image data according to the changed posture of the information processing terminal device, until the generation of the display image data by the generating control instruction is completed.

A control method of an information processing terminal device, comprising:
acquiring image data;
detecting a posture of the information processing terminal device;
generating display image data according to the detected posture of the information processing terminal device based on the acquired image data; and
displaying the generated display image data on a display unit,
wherein, if the posture of the information processing terminal device is changed, the display image data is generated according to the changed posture of the information processing terminal device, and
wherein, if the posture of the information processing terminal device is changed during the generation of the image data by the generating unit, the display image data is not generated according to the changed posture of the information processing terminal device until the generation of the display image data is completed.

BRIEF DESCRIPTION OF DRAWINGS

FIG. 6 is a view illustrating an example of a storage table.

DESCRIPTION OF EXEMPLARY EMBODIMENTS

First Embodiment

Figure 1:
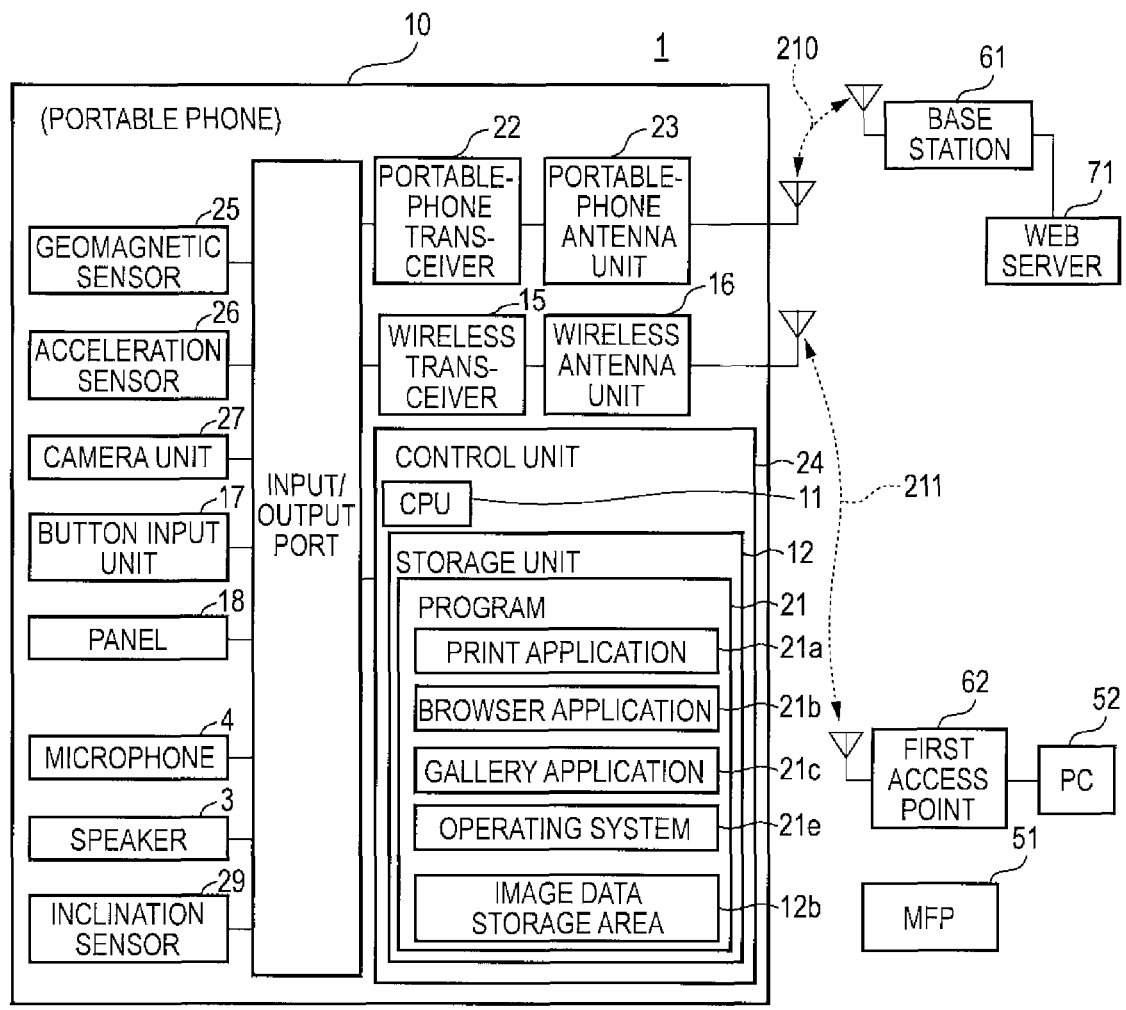
FIG. 1 is a block diagram of a communication system 1.

FIG. 1 shows a block diagram of a communication according to a first embodiment. The communication system 1 includes a portable phone 10, a multifunction peripheral (MFP) 51, a personal computer (PC) 52, a first address point 62, and a Web server 71, and a base station 61. The portable phone 10 and the MFP 51 have a function as a known wireless LAN terminal device. The MFP 51 is a multifunction peripheral having a printer function, a scanner function, a copy function, a facsimile function, and the like. The first address point 62 has a function as a known wireless LAN access point. The Web server 71 is an apparatus that provides its own functions or data to a client apparatus on a network.

The portable phone 10 and the first address point 62 are configured to wireless communication (data communication using an electric wave) 211 in an infrastructure mode of a wireless LAN type (a mode in which a plurality of wireless LAN terminal devices perform communication through access points). In other words, the portable phone 10 access the first address point 62 and becomes a status capable of performing the wireless communication 211 in the wireless LAN infrastructure mode, the portable phone 10 can perform data communication with the MFP 51 and the PC 52 through the first address point 62. Examples of the wireless LAN type include communication types defined in standards of IEEE 802.11a, 802.11b, 802.11g, and 802.11n. The portable phone 10 is also configured to be capable of data communication with the Web server 71 through the base station 61.

A configuration of the portable phone 10 will be described. As shown in FIG. 1, the portable phone 10 mainly includes a control unit 24, a wireless transceiver 15, a wireless antenna unit 16, a button input unit 17, a panel 18, a portable-phone transceiver 22, a portable-phone antenna unit 23, a geomagnetic sensor 25, an acceleration sensor 26, a camera unit 27, and a tilt sensor (also referred to as a gyroscope) 29. The portable phone 10 further includes a speaker 3 and a microphone 4 for making a call and inputting a voice. The geomagnetic sensor 25, the acceleration sensor 26, and the tilt sensor 29 are examples of motion sensors.

The control unit 24 includes a central processing unit (CPU) 11 and a storage unit 12. The storage unit 12 is configured by a combination of a random access memory (RAM), a read only memory (ROM), a flash memory, a hard disk (HDD), a buffer of the CPU 11, and the like. The storage unit 12 includes a program 21 and an image data storage area 12b. The image data storage area 12b stores various kinds of image data. The program 21 includes a print application 21a, a browser application 21b, a gallery application 21c, and an operating system 21e.

The print application 21a is an application for making the MFP 51 to perform a print process or the like, from the portable phone 10. The browser application 21b is an application for displaying Web data on the panel 18. The CPU 11 can perform processes according to the browser application 21b for acquiring Web data from the Web server 71, storing the Web data in the storage unit 12, and displaying an image represented by the Web data in the storage unit 12, on the panel 18. The gallery application 21c is an application for display of an image generated on the basis of display image data, and so on.

The operating system 21e is a program for providing basic functions commonly used for the print application 21a and the browser application 21b. The operating system 21e includes a program for making the portable-phone transceiver 22 perform communication, a program for making the wireless transceiver 15 performing the wireless communication 211, and so on. The operating system 21e is also a program for proving an application programming interface (API) used for each program to acquire information calculated by the geomagnetic sensor 25, the acceleration sensor 26, the tilt sensor 29, and the like.

The CPU 11 controls each unit of the portable phone 10 in accordance with the program 21 stored in the storage unit 12, various signals transmitted and received through the wireless transceiver, or the like. Here, the CPU 11 that executes the print application 21a, the operating system 21e, or the like is also referred to simply as the name of the corresponding program. For example, the term 'print application 21a' means the CPU 11 that executes the print application 21a.

The wireless transceiver 15 performs the wireless communication 211 through the wireless antenna unit 16 in the infrastructure mode of the wireless LAN. Therefore, digital signals constituting various kinds of data are transmitted and received by the wireless transceiver 15. The portable-phone transceiver 22 performs wireless communication 210 with the base station 61 through the portable-phone antenna unit 23 in a portable-phone communication type. The button input unit 17 is an input receiving unit for receiving a manipulation of a user on the portable phone 10. The button input unit 17 is configured as a touch panel, integrally with the panel 18. The panel 18 displays various function information of the portable phone 10. The geomagnetic sensor 25 is a sensor for measuring an direction of a fore end portion of the portable phone 10 by detecting a geometric field. The acceleration sensor 26 is a sensor for measuring an acceleration of the portable phone 10 by detecting a change in position of a spindle. The camera unit 27 is a unit for imaging a predetermined range by a CCD or the like so as to acquire image data. The tilt sensor 29 is a sensor for measuring a tilt angle of the portable phone 10 relative to a horizontal plane by detecting an angular velocity. The operating system 21e provides an API used for each program to acquire the angular velocity measured by the acceleration sensor 26, the image data acquired by the camera unit 27, the tilt angle measured by the tilt sensor 29, and so on.

Figure 4:
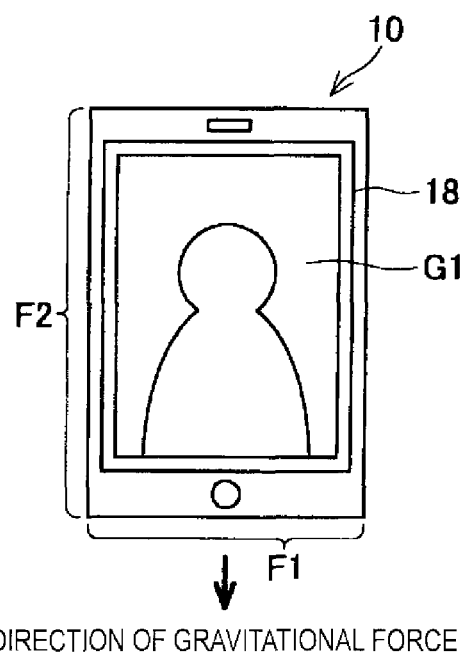
FIG. 4 is an overview diagram of a portable phone.
Figure 5:
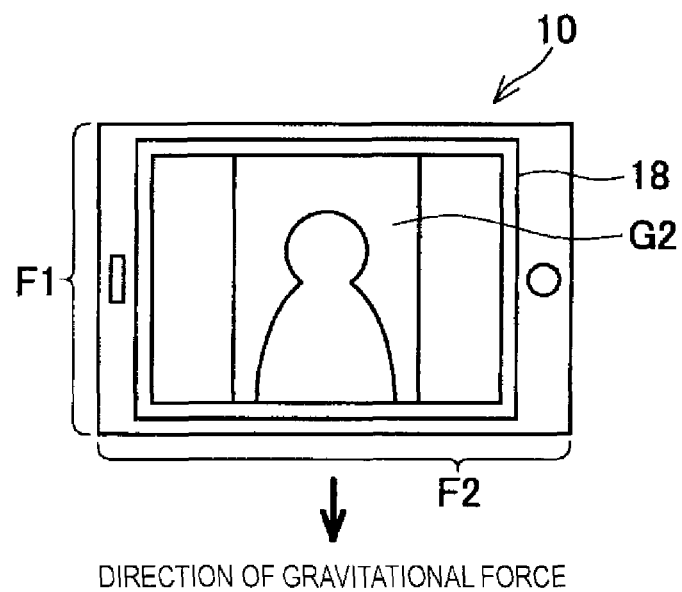
FIG. 5 is another overview diagram of the portable phone.

FIGS. 4 and 5 shows overview diagrams of the portable phone 10. Referring to FIGS. 4 and 5, a case where a print preview display image based on vertical image data will be described as an example. The image data is data which is the source of the print preview display image. For example, in a case where the format of the image data corresponds to an exchangeable image file format (Exif), information representing that the image data represents a vertical image may be read from metadata added to the image data. FIG. 4 shows an example of a case where the portable phone 10 is vertical. FIG. 5 shows an example of a case where the portable phone 10 is horizontal. The portable phone is rectangular, and has a short side F1 and a long side F2. As shown in FIG. 4, the long side F2 defines a direction along the direction of gravitational force as the longitudinal direction of the portable phone 10. Further, as shown in FIG. 5, the short side F1 defines the direction of gravitational force as the lateral direction of the portable phone 10. As shown in FIG. 4, a vertical print preview display image G1 is displayed on the panel 18 of the vertical portable phone 10. Meanwhile, as shown in FIG. 5, a horizontal print preview display image G2 is displayed on the panel 18 of the horizontal portable phone 10. The vertical print preview display image G1 is displayed over the entire panel 18, whereas the horizontal print preview display image G2 is displayed at a portion in the vicinity of the center of the panel 18. Therefore, the vertical print preview display image G1 is more detailed than the horizontal print preview display image G2. In other words, a data size of a vertical print preview display image data for displaying the vertical print preview display image G1 is larger than a data size of a horizontal print preview display image data for displaying the horizontal print preview display image G2.

Operation of Gallery Application

An operation of the communication system 1 according to the present embodiment will be described with reference to flows of FIGS. 2 and 3. An operation of making the print application 21a perform data sharing, from the gallery application 21c, will be described. If the user input a manipulation for starting the gallery application 21c through the button input unit 17, the CPU 11 starts the gallery application 21c. In STEP S11, the CPU 11 performs a process for reading image data stored in an area of the image data storage area 12b corresponding to the gallery application 21c. Next, the CPU 11 displays a display image represented by the image data, and a data sharing button, on the panel 18. The data sharing button is a button for inputting a data sharing command for instructing data sharing between the gallery application 21c and another application.

In STEP S13, the CPU 11 determines whether any sharing command has been input by the user. Specifically, the CPU 11 determines whether any data sharing button has been touched by the user. In a case where any data sharing command has not been input (NO in STEP S13), the operation returns to STEP S11. Meanwhile, in a case where a data sharing command has been input (YES in STEP S13), the CPU 11 displays a list of candidates for a destination application for data sharing, on the panel 18.

If it is determined that the print application 21a has been selected as an application to share image data, in STEP S17, the CPU 11 issues a start instruction. The start instruction is a command for starting the print application 21a. Then, the flow is finished.

Operation of Print Application

An operation of the CPU 11 based on the print application 21a will be described with reference to FIG. 3. If receiving the start instruction, in STEP S113, the CPU 11 starts the print application 21a. Next, the CPU 11 acquires the direction of the portable phone 10, and stores the direction of the portable phone 10 in the storage unit 12. Specifically, the direction of the portable phone detected by the tilt sensor 29 is notified from the operating system 21e to the print application 21a. Next, on the basis of the print application 21a, the CPU 11 acquires the notified direction of the portable phone 10, and stores the direction of the portable phone 10 in the storage unit 12.

In STEP S114, the CPU 11 acquires the number of pieces of image data shared with the gallery application 21c, together with a file path for accessing the shared image data.

In STEP S115, the CPU 11 determines whether there is plural pieces of image data shared with the gallery application 21c. In a case where there is plural pieces of shared image data (YES in STEP S115), the operation proceeds to STEP S119, and in a case where there is not plural pieces of image data (NO in STEP S115), the operation proceeds to STEP S117.

In STEP S17, the CPU 11 determines whether the image data shared with the gallery application 21c is image data requiring external conversion process. The external conversion process is a process of performing a conversion process on the image data in an external device such as the PC 52. Examples of the image data requiring an external conversion process include image data having a portable document format (PDF). In a case where any external conversion process is not required (NO in STEP S117), the operation proceeds to STEP S132, and in a case where an external conversion process is required (YES in STEP S117), the operation proceeds to STEP S119.

In STEP S119, the CPU 11 acquires a current direction of the portable phone 10. In STEP S121, the CPU 11 determines whether the current direction of direction of the portable phone 10 is the longitudinal direction. In a case where it is determined that the current direction is the vertical direction, the operation proceeds to STEP S123 in which the CPU 11 fixes the direction of the portable phone to the vertical direction. Specifically, the CPU 11 outputs an instruction for fixing the direction of the portable phone 10 to the vertical direction, to the operating system 21e. Therefore, in a case of changing a posture of the portable phone from the vertical direction to the horizontal direction during the process of generating print preview display image data to be described below, until generation of horizontal print preview display image data is completed, vertical print preview display image data cannot be generated.

Meanwhile, in STEP S121, if it is determined that the direction of the portable phone 10 is not the vertical direction (NO in STEP S121), the operation proceeds to STEP S125 in which the CPU 11 fixes the direction of the portable phone 10 to the horizontal direction. Therefore, in a case where the posture of the portable phone 10 is charged from the horizontal direction to the vertical direction during the process of generating the print preview display image data, until generation of horizontal print preview display image data is completed, print preview display image data according to the vertical posture cannot be generated.

In STEP S127, the CPU 11 acquires the plural pieces of image data on the basis of the file path acquired in STEP S114, and stores the image data in the storage unit 12. Specifically, the CPU 11 copies the image data stored in the area of the image data storage area 12b assigned to the gallery application 21c, onto an area of the image data storage area 12b assigned to the print application 21a.

In STEP S128, the CPU 11 generates print preview display image data according to the direction of the portable phone 10 acquired in STEP S119, on the basis of the image data acquired in STEP S127. The print preview display image data is data for displaying a print preview representing a print state in a case of printing the image data by the MFP 51.

In STEP S131, if the CPU 11 determines that print preview display image data regarding all pieces of the image data have been generated, the CPU 11 releases the fixing of the direction of the portable phone 10. Specifically, the CPU 11 outputs an instruction for releasing the fixing the direction of the portable phone 10 to the operating system 21e.

In STEP S132, the CPU 11 determines whether the direction of the portable phone 10 has been changed. Specifically, on the basis of whether a notification for notifying that the direction of the portable phone 10 has been changed has been received from the operating system 21e, the CPU 11 determines whether the direction of the portable phone 10 has been changed. In a case where the direction of the portable phone 10 has been changed (YES in STEP S132), the operation returns to STEP S121, and in a case where the direction of the portable phone 10 has not been changed (NO in STEP S132), the operation proceeds to STEP S133. In STEP S133, the CPU 11 displays a print preview display image based on the print preview display image data generated in STEP S128, on the panel 18. In a case where the direction of the portable phone 10 has been changed (YES in STEP S132), the CPU 11 sequentially performs the process of STEP S121 and the subsequent processes according to the flow of FIG. 3. However, since the image data has already been stored in the area of the image data storage area 12b assigned to the print application 21a, the process of STEP S127 is skipped.

In STEP S135, the CPU 11 determines whether a display finishing instruction for finishing the displaying of the print preview display image has been input. Examples of the display finishing instruction include a print instruction (for example, pushing of a print button), a cancel instruction (for example, pushing of a cancel button), and the like. In a case where any display finishing instruction has not been input (NO in STEP S135), the operation returns to STEP S132, and in a case where a display finishing instruction has been input (YES in STEP S135), the flow is finished.

The effects of the print application 21a according to the first embodiment will be described. In the print application 21a, it is possible to generate the print preview display image data on the basis of the direction of the portable phone 10 during the start of the generation of the print preview display image data, until the generation of the print preview display image data is completed. Therefore, for example, even if the user unintentionally changes the direction of the portable phone 10 during the process of generating the print preview display image data, a process of generating print preview display image data according to the changed direction of the portable phone 10 can be prevented from being performed from the beginning. As result, the portable phone 10 can receive a user's manipulation even before the process of generating the print preview display image data image before a process of generating print preview display image data is completed, and it is possible to prevent an increase in a waiting time until the print preview display image data is displayed.

Further, in the print application 21a, the image data is stored in the image data storage area 12b. In this case, generally, the time required for the process of storing the image data in the image data storage area 12b is larger than the time required for the process of generating the print preview display image data from the image data. Therefore, in the print application 21a, in a case whether the user unintentionally changes the posture of the portable phone 10 in the middle of performing the process of storing the image data in the image data storage area 12b, a process of storing image data in the image data storage area 12b according to the changed direction can be prevented from being performed from the beginning. As a result, it is possible to prevent an increase in the waiting time until the print preview display image data is displayed.

In a case where plural pieces of image data have been acquired, the time required for various processes such as a process of generating print preview display image data becomes longer, as compared to a case of acquiring one piece of image data. However, in the print application 21a, in a case of acquiring plural pieces of image data, in STEP S123 or STEP S125, a process of fixing the direction of the portable phone 10 is performed. Therefore, for example, even if the user unintentionally changes the direction of the portable phone 10 during the process of generating the print preview display image data, a process of generating print preview display image data according to the changed direction of the portable phone 10 can be prevented from being performed from the beginning.

Second Embodiment

A second embodiment will be described. In the second embodiment, print preview display image data generated once are stored. Then, print preview display images are redisplayed using the stored print preview display image data.

FIG. 6 shows an example of storage table TB1. The storage table TB1 is stored in the storage unit 12. The storage table TB1 is a table for identifying whether vertical print preview display image data and horizontal print preview display image data have been generated and stored with respect to each of the plural pieces of the image data. The vertical direction is data used for displaying the vertical print preview display image G1 (FIG. 4). Further, the horizontal print preview display image data is data used for displaying the horizontal print preview display image G2.

The storage table TB1 stores identification numbers 300, first file paths 301, second file paths 302, vertical print preview display image data flags 303, third file paths 304, and horizontal print preview display image data flags 305. The identification numbers 300 are consecutive numbers for identifying each image data. The first file paths 301 are information for accessing the image data stored in the image data storage area 12b. The image data is data which is the sources of print preview display image data. The second file paths 302 are information for accessing the vertical print preview display image data stored in the image data storage area 12b. Each of the vertical print preview display image data flags 303 is information representing whether vertical print preview display image data regarding image data identified by a corresponding identification number 300 has been stored in the image data storage area 12b. The third file paths 304 are information for accessing the horizontal print preview display image data stored in the image data storage area 12b. Each of the horizontal print preview display image data flags 305 is information representing whether a horizontal print preview display image data regarding image data identified by a corresponding identification number 300 has been stored in the image data storage area 12b. A communication system used in the second embodiment is the same as the communication system 1 (FIG. 1) according to the first embodiment, and thus the redundant description will not be repeated.

Figure 7:
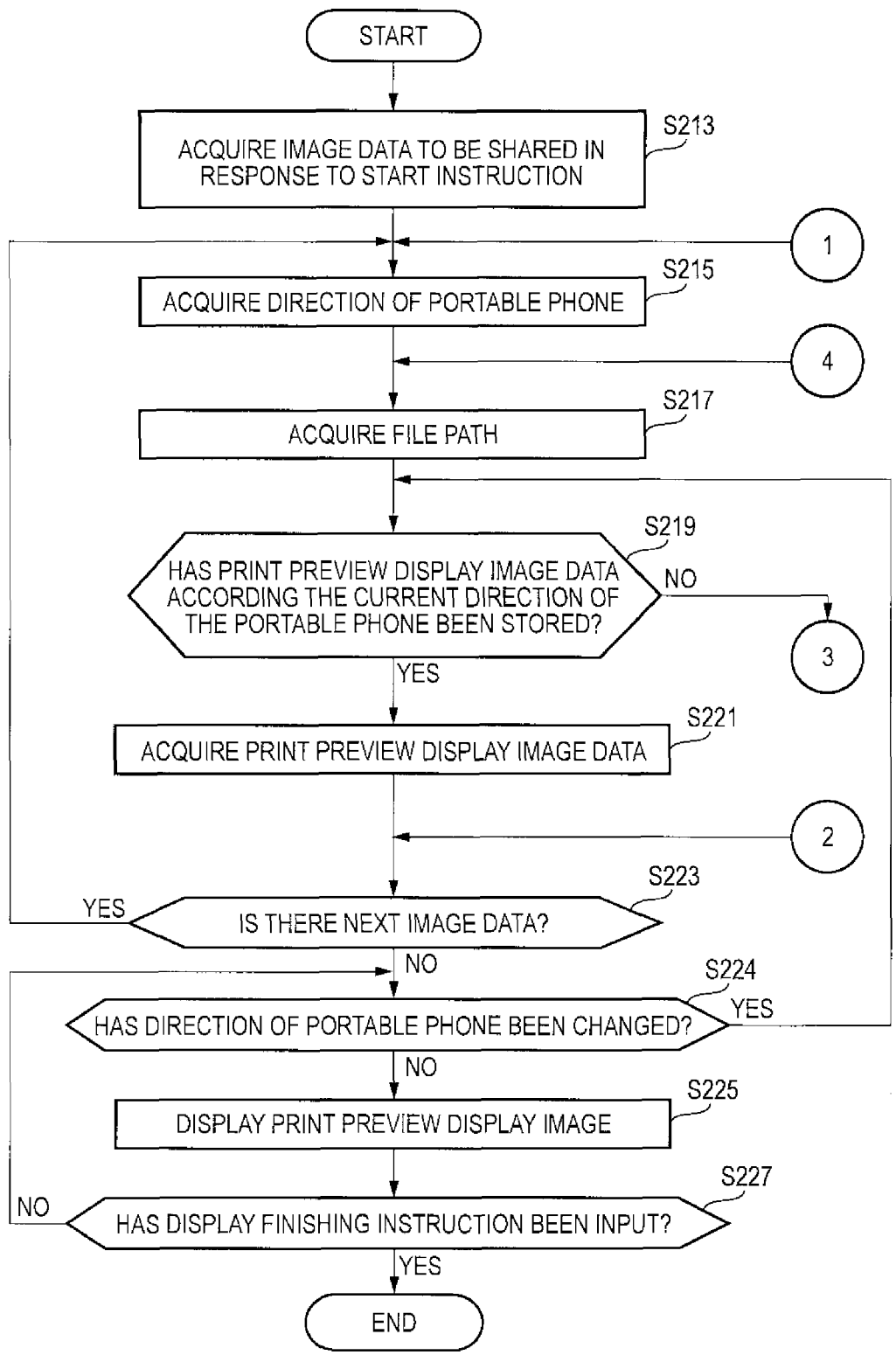
FIG. 7 is a flowchart illustrating an operation of another print application.

An operation of the CPU 11 based on the print application 21a will be described with reference to FIGS. 7 and 8. In STEP S213, the CPU 11 starts the print application 21a in response to reception of a start instruction. Then, the CPU 11 acquires the number of pieces of image data to be shared with the gallery application 21c. In STEP S215, the CPU 11 acquires the direction of the portable phone 10 and stores the direction of the portable phone 10 in the storage unit 12. In STEP S217, the CPU 11 acquires a first file path 301 for accessing image data to be shared with the gallery application 21c.

In STEP S219, the CPU 11 determines whether print preview display image data according to the current direction of the portable phone 10 has already been stored in the image data storage area 12b with respect to current image data selected as a target for generating print preview display image data. Specifically, a cell at the intersection of a row corresponding to an identification number 300 of the current selected image data and a column (any one of a column of a vertical print preview display image data flag 303 and a column of a horizontal print preview display image data flag 305) corresponding to the current direction of the portable phone 10 in the storage table TB1 (FIG. 6) is referred to. Then, it is determined whether a flag in the reference cell is 'existence'. In a case where the print preview display image data according to the current direction of the portable phone 10 has been stored (YES in STEP S219), the operation proceeds to STEP S221.

In STEP S221, the CPU 11 acquires the print preview display image data stored in the image data storage area 12b. Specifically, the CPU 11 acquires the print preview display image data on the basis of the second file path 302 or the third file path 304 in the row corresponding to the identification number 300 of the current selected image data.

In STEP S223, the CPU 11 determines whether there is image data having the next identification number 300. In a case where there is image data having the next identification number 300 (YES in STEP S223), the operation returns to STEP S215, and in a case where there is no image data having the next identification number 300 (NO in STEP S223), since the process on all pieces of the image data has been completed, the operation proceeds STEP S224. In STEP S224, the CPU 11 determines whether the direction of the portable phone 10 has been changed. In a case where the direction of the portable phone 10 has been changed, the operation returns to STEP S219, and in a case where the direction of the portable phone 10 has not been changed, the operation proceeds to STEP S225.

In STEP S225, the CPU 11 displays a print preview display image generated from image data having '1' as the identification number 300. Further, in STEP S225, in response to reception of an input of a switch instruction (for example, pushing of a switch button displayed on the panel 18) for switching the print preview display image displayed on the in the panel 18 in the order of the identification numbers 300, the CPU 11 switches the print preview display image displayed on the in the panel 18 in the order of the identification numbers 300. In STEP S227, the CPU 11 determines whether any display finishing instruction for finishing the displaying of the print preview display image has been input. In a case where any display finishing instruction has not been input (NO in STEP S227), the operation returns to STEP S224, and in a case where a display finishing instruction has been input (YES in STEP S227), the flow is finished.

Figure 8:
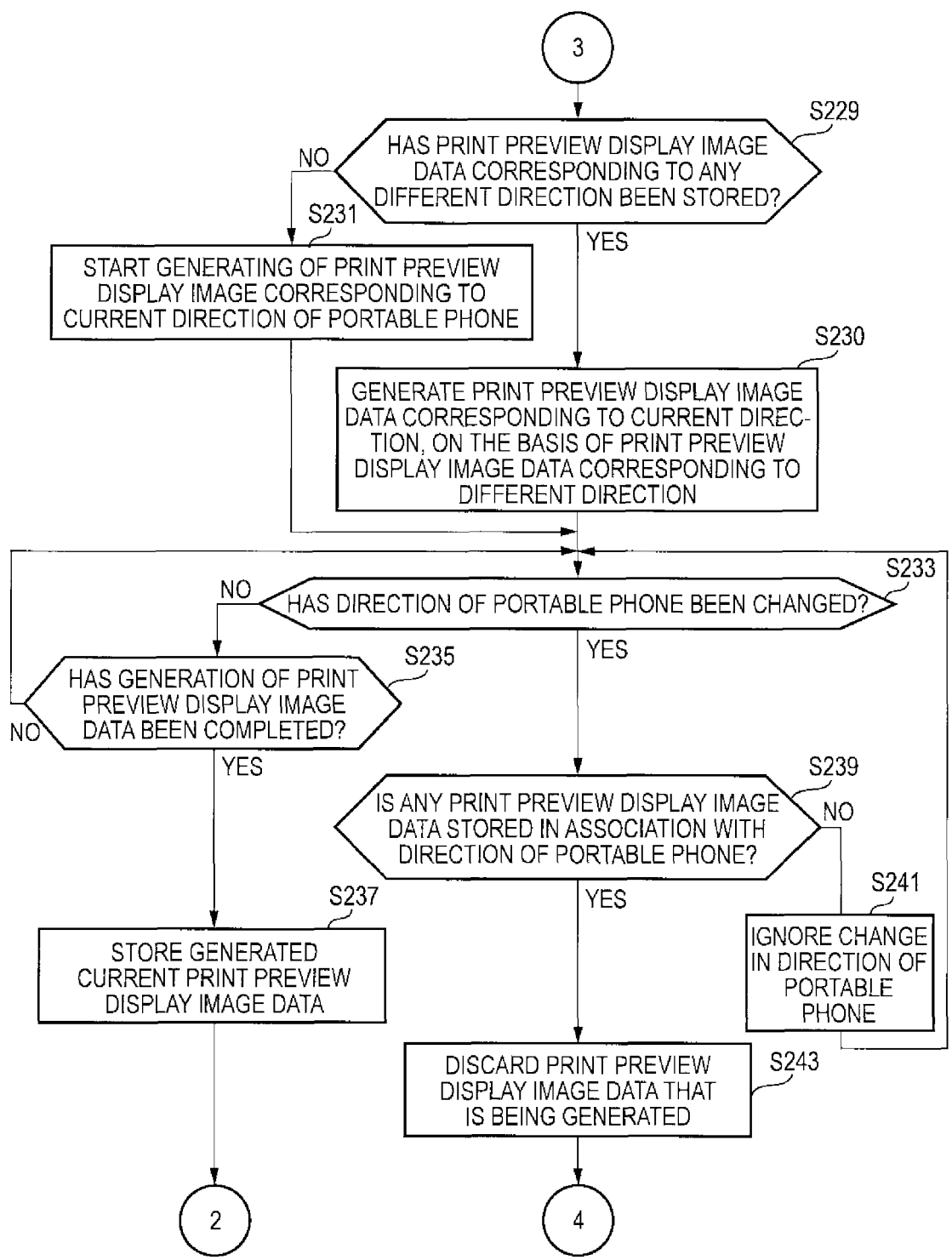
FIG. 8 is another flowchart illustrating the operation of another print application.

Meanwhile, in a case where it is determined in STEP S219 that there is no corresponding print preview display image data stored in the image data storage area 12b (NO in STEP S219), the operation proceeds to STEP S229 (FIG. 8). In STEP S219, the CPU 11 determines whether there is any print preview display image data, corresponding to a direction different from the current direction of the portable phone 10, stored in the image data storage area 12b. Specifically, the CPU 11 refers to a cell at the intersection of a row corresponding to the identification number 300 of the current selected image data and a column that does not correspond to the current direction in the storage table TB1 (FIG. 6). In a case where it is determined that there is no corresponding print preview display image data stored in the image data storage area 12b (NO in STEP S229), the operation proceeds to STEP S231. In STEP S231, the CPU 11 generates print preview display image data according to the acquired direction of the portable phone 10, on the basis of the image data shared with the gallery application 21c. Then, the operation proceeds to STEP S233.

Meanwhile, in a case where it is determined in STEP S229 that there is any corresponding print preview display image data stored in the image data storage area 12b (YES in STEP S229), the operation proceeds to STEP S230. In STEP S230, the CPU 11 generates print preview display image data correspond to the current direction of the portable phone 10, on the basis of the print preview display image data corresponding to a direction different from the current direction of the portable phone 10. Then, the operation proceeds to STEP S233.

An example of a process of generating print preview display image data on the basis of the print preview display image data corresponding to the direction different from the current direction of the portable phone 10 will be described. A case where the image data having '1' as the identification number 300 of FIG. 6 has been selected as a process subject will be described. Further, in a case where the direction of the portable phone 10 is the horizontal direction will be described. In STEP S215, the CPU 11 acquires the horizontal direction as the direction of the portable phone 10. In STEP S219, the CPU 11 refers to a flag in a cell at the intersection of the row corresponding to '1' which is the identification number 300 of the current selected image data, and a column of a horizontal print preview display image data flag 305 corresponding to the horizontal direction which is the current direction of the portable phone 10, in the storage table TB1 (FIG. 6). The flag in the reference cell represents 'NON-EXISTENCE' (NO in STEP S219). However, the vertical print preview display image data flag 303 represents 'EXISTENCE' (YES in STEP S229), and thus the operation proceeds to STEP S230. Then, in STEP S230, on the basis of the vertical print preview display image data for displaying the vertical print preview display image G1 (FIG. 4), horizontal print preview display image data for displaying the horizontal print preview display image G2 (FIG. 5) corresponding to the current direction of the portable phone 10.

In STEP S233, the CPU 11 determines whether the direction of the portable phone 10 has been changed. In a case where the direction of the portable phone 10 has been changed (NO in STEP S233), the operation proceeds to STEP S235. In STEP S235, the CPU 11 determines whether the generation of the print preview display image data has been completed. In a case where the generation of the print preview display image data has not been completed (NO in STEP S235), the operation returns to STEP S233, and in a case where the generation of the print preview display image data has been completed (YES in STEP S235), the operation proceeds to STEP S237. In STEP S237, the CPU 11 stores the generated current print preview display image data, in the image data storage area 12b. Further, the CPU 11 stores a file path (the second file path 302 or the third file path 304) of the stored print preview display image data, in a cell corresponding to the identification number 300 of the image data used for the current print preview display image data. Furthermore, the CPU 11 changes a flag of the vertical print preview display image data flag 303 or the horizontal print preview display image data flag 305, corresponding to the direction of the generated current print preview display image data, to 'EXISTENCE'. Therefore, it is possible to store each print preview display image data in association with the direction of the portable phone 10 and the second file path 302. Then, the operation returns to STEP S223 (FIG. 7).

Meanwhile, in a case where it is determined that the direction of the portable phone 10 has been changed (YES in STEP S233), the operation proceeds to STEP S239. In STEP S239, the CPU 11 determines whether there is any print preview display image data, corresponding to the changed direction of the portable phone 10, stored in the image data storage area 12*b* with respect to the image data having the current selected identification number 300. In a case where it is determined that there is a print preview display image data, corresponding to the changed direction of the portable phone 10, stored in the image data storage area 12*b* (YES in STEP S239), the operation proceeds to STEP S243, the CPU 11 discards the print preview display image data which is being generated. Then, the operation returns to STEP S217 (FIG. 7). Meanwhile, in a case where it is determined that there is no print preview display image data, corresponding to the changed direction of the portable phone 10, stored in the image data storage area 12*b* (NO in STEP S239), the CPU 11 ignores the change in direction of the portable phone 10. Specifically, the CPU 11 ignores information on the direction of the portable phone 10 received from the operating system 21*e*. Then, the operation returns to STEP S233.

The effects of the print application 21*a* according to the second embodiment will be described. In the print application 21*a*, if a print preview display image item is generated once, since the print preview display image data is stored, it is possible to avoid the trouble of having to regenerate the corresponding print preview display image data. Therefore, it is possible to display print preview display images more quickly, and to improve the convenience for the user.

Further, according to the print application 21*a*, it is possible to regenerate a horizontal print preview display image data on the basis of an already generated vertical print preview display image data, and to regenerate vertical print preview display image data on the basis of horizontal print preview display image data which has been already generated. Therefore, it is possible to display print preview display images more quickly, as compared to a case of generating each print preview display image from the beginning.

Third Embodiment

A third embodiment will be described. The third embodiment is a modification of the operation of the print application 21*a* according to the second embodiment. Specifically, when print preview display image data are generated from the plural pieces of image data, one by one, the direction of the portable phone 10 is checked whenever one print preview display image data is generated. A communication system used in the third embodiment is the same as the communication system 1 (FIG. 1) according to the first embodiment, and thus the redundant description will not be repeated.

Figure 9:
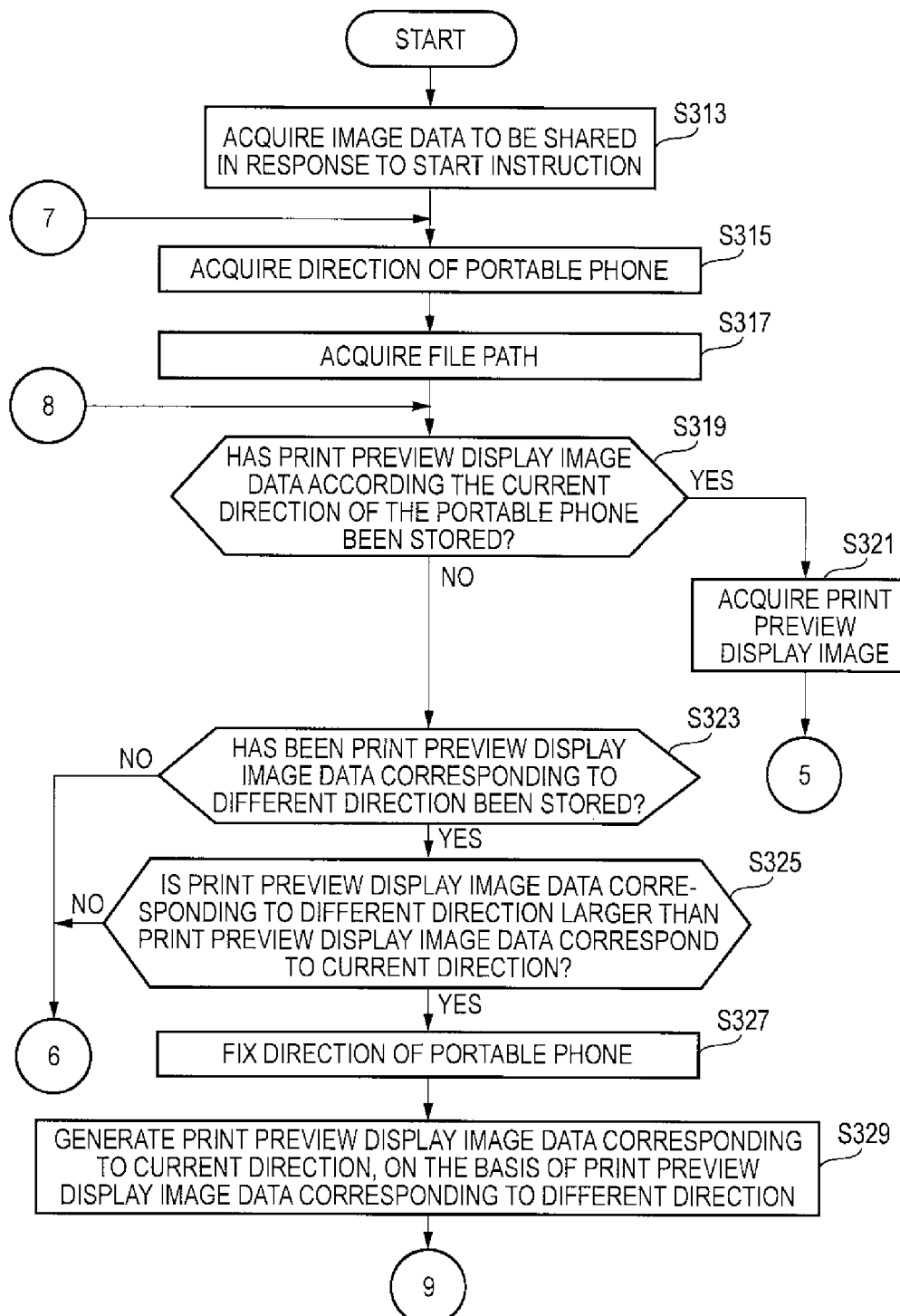
FIG. 9 is a further flowchart illustrating an operation of another print application.

An operation of the CPU 11 based on the print application 21*a* will be described with reference to FIGS. 9 and 10. The operations in STEP S313 to STEP S319 of FIG. 9 are the same as the operations of STEP S213 to STEP S219 (FIG. 7), and thus the redundant description will not be repeated. In a case where it is determined in STEP S319 that a print preview display image corresponding to the current direction of the portable phone has already been stored with respect to the current selected image data which is a target for the processing of generating print preview display image data (YES in STEP S319), the operation proceeds to STEP S321. In STEP S321, the CPU 11 acquires the print preview display image data from the image data storage area 12*b*. Then, the operation proceeds to STEP S339 (FIG. 10).

Meanwhile, in a case where it is determined in STEP S319 that there is no corresponding print preview display image stored in the image data storage area 12*b* (NO in STEP S319), the operation proceeds to STEP S323. In STEP S333, the CPU 11 determines whether there is any print preview display image data, corresponding to a direction different from the current direction of the portable phone 10, stored in the image data storage area 12*b*. In a case where it is determined that there is no corresponding print preview display image data stored in the image data storage area 12*b* (NO in STEP S323), the operation proceeds to STEP S331 (FIG. 10), and in a case where it is determined that there is a corresponding print preview display image data stored in the image data storage area 12*b* (YES in STEP S323), the operation proceeds to STEP S325.

In STEP S325, the CPU 11 determines whether the data size of the print preview display image data corresponding to the direction different from the current direction of the portable phone 10 is larger than the data size of the print preview display image data corresponding to the current direction of the portable phone 10. In a case where it is determined that the data size of the print preview display image data corresponding to the direction different from the current direction of the portable phone 10 is not larger than the data size of the print preview display image data corresponding to the current direction of the portable phone 10 (NO in STEP S325), the operation proceeds to STEP S331 (FIG. 10), and in a case where it is determined that the data size of the print preview display image data corresponding to the direction different from the current direction of the portable phone 10 is larger than the data size of the print preview display image data corresponding to the current direction of the portable phone 10 (YES in STEP S325), the operation proceeds to STEP S327. In STEP S327, the CPU 11 fixes the current direction as the direction of the portable phone 10. In STEP S329, the CPU 11 generates print preview display image data corresponding to the current direction of the portable phone 10, on the basis of the print preview display image data corresponding to the direction different from the current direction of the portable phone 10. Examples of the process that the CPU 11 performs in STEP S329 include a thinning and reduction process on print preview display image data having a large data size. Then, the operation proceeds to STEP S335.

Figure 10:
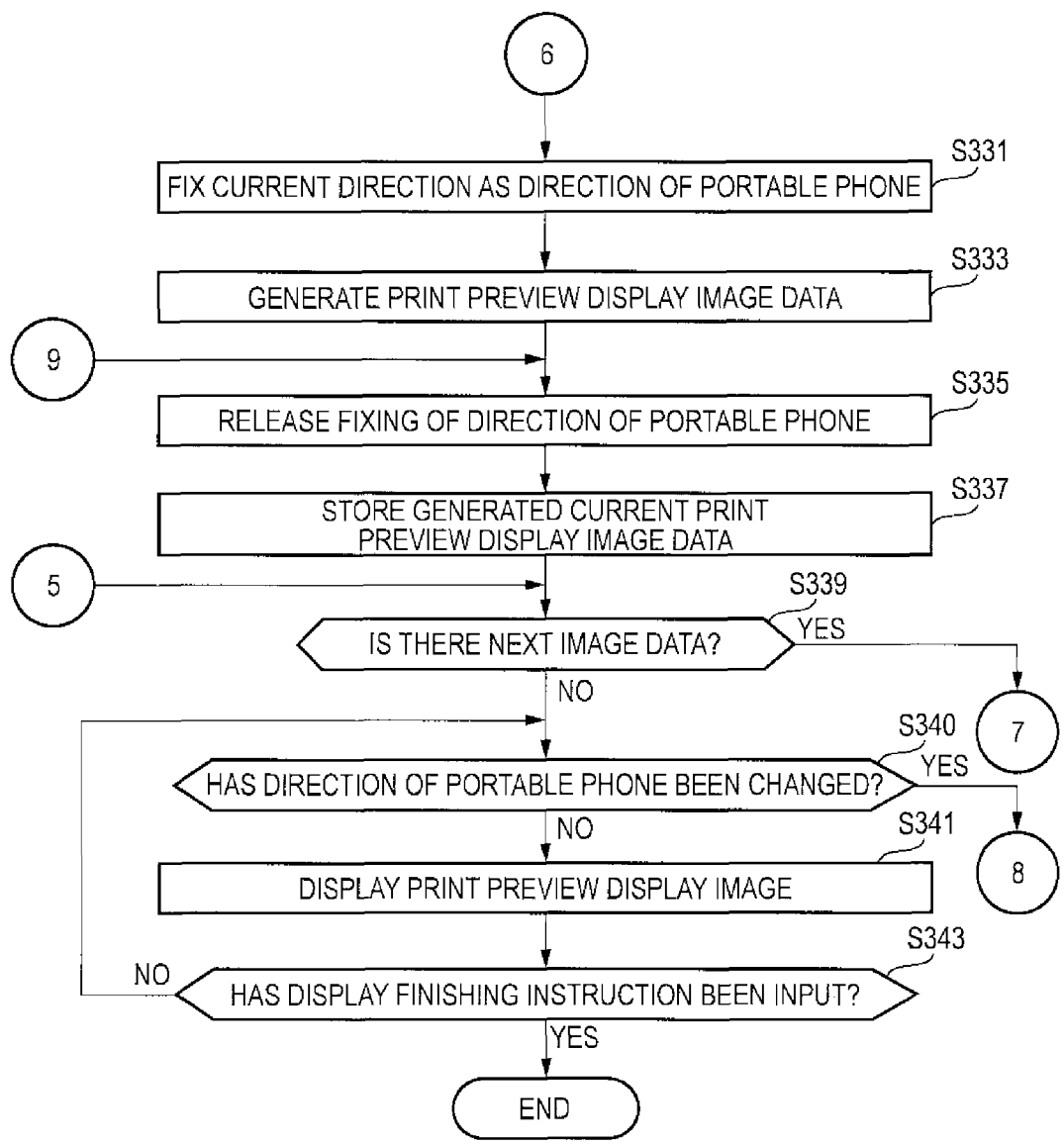
FIG. 10 is a still further flowchart illustrating an operation of another print application.

In STEP S331 of FIG. 10, the CPU 11 fixes the current direction as the direction of the portable phone 10. In STEP S333, the CPU 11 generates print preview display image data corresponding to the acquired direction of the portable phone 10, on the basis of the image data shared with the gallery application 21*c*. In STEP S335, the CPU 11 releases the fixing of the direction of the portable phone 10. The detailed contents of the process of fixing the direction of the portable phone 10 is the same as the contents of the process of STEP S123 or STEP S125 (FIG. 3) of the first embodiment, and the detailed contents of the process of releasing the fixing are the same as the contents of the process of STEP S131 (FIG. 3) of the first embodiment. Thus, the redundant description will not be repeated. In STEP S337, the CPU 11 stores the generated current print preview display image data in the image data storage area 12b. The detailed process contents of STEP S337 are the same as the process contents of STEP S237 (FIG. 8), and thus the redundant description will not be repeated.

In STEP S339, the CPU 11 determines whether there is any image data having the next identification number 300. In a case where there is the next image data (YES in STEP S339), the operation returns to STEP S315, and in a case where there is no next image data (NO in STEP S339), since the process on all pieces of the image data has been completed, the operation proceeds to STEP S340. In STEP S340, the CPU 11 determines whether the direction of the portable phone 10 has been changed. In a case where the direction of the portable phone 10 has been changed (YES in STEP S340), the operation returns to STEP S319, and in a case where the direction of the portable phone 10 has not been changed (NO in STEP S340), the operation proceeds to STEP S341.

In STEP S341, the CPU 11 displays a print preview display image based on the generated print preview display image data. Further, in STEP S341, the CPU 11 switches the print preview display image displayed on the panel 18 in the order of the identification numbers 300, in response toe reception of an input of a switch instruction. In STEP S343, the CPU 11 determines whether any display finishing instruction for finishing the displaying of the print preview display image has been input. In a case where any display finishing instruction has not been input (NO in STEP S343), the operation returns to STEP S340, and in a case where a display finishing instruction has been input (YES in STEP S343), the flow is finished.

The effects of the print application 21a according to the third embodiment will be described. In the print application 21a, in a case of acquiring print preview display image data from plural pieces of image data, one by one, whenever one print preview display image data is acquired, in STEP S315, the direction of the portable phone 10 is checked. Therefore, each print preview display image data are obtained according the checked direction of the portable phone 10. As a result, the portable phone 10 can receive a user's manipulation even before the process of generating the print preview display image data image before print preview display image data is acquired with respect to all pieces of image data.

Fourth Embodiment

A fourth embodiment will be described. The fourth embodiment relates to an operation after generation of print preview display image data is completed. A communication system used in the fourth embodiment is the same as the communication system 1 (FIG. 1) according to the first embodiment, and thus the redundant description will not be repeated.

Figure 11:
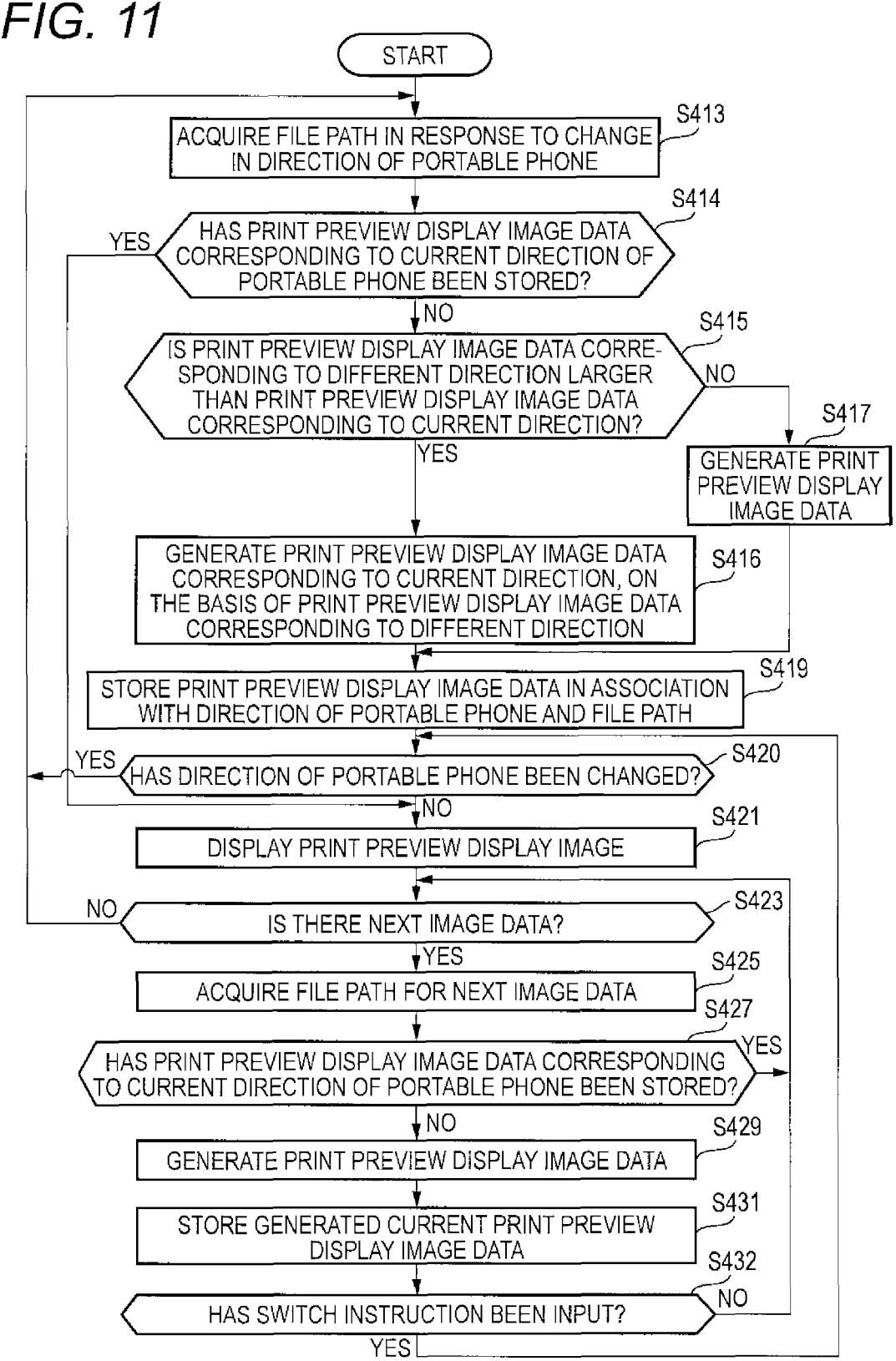
FIG. 11 is a flowchart illustrating an operation of another print application.

An operation of the CPU 11 based on the print application 21a will be described with reference to FIG. 11. The flow of FIG. 11 starts after the generation of the plural pieces of print preview display image data is completed according the flows of the follows of the first to third embodiments, or the like. In STEP S413, the CPU 11 acquires a file path for accessing the print preview display image data if it is determined that it is determined that the direction of the portable phone 10 has been changed. In this case, the CPU 11 acquires the file path for current displayed print preview display image data of the plural pieces of print preview display image data.

In STEP S414, the CPU 11 determines whether there is any print preview display image data, corresponding to the changed direction of the portable phone 10, already stored with respect to the current displayed print preview display image data in the image data storage area 12b. In a case where it is determined that there is corresponding print preview display image data (YES in STEP S414), the operation proceeds to STEP S421, and in a case where it is determined that there is no corresponding print preview display image data (NO in STEP S414), the operation proceeds to STEP S415.

In STEP S415, the CPU 11 determines whether the data size of the print preview display image data corresponding to the current direction of the portable phone is larger than the data size of the print preview display image data corresponding to the changed direction. In a case where the data size of the print preview display image data corresponding to the current direction of the portable phone is not larger than the data size of the print preview display image data corresponding to the changed direction (NO in STEP S415), the operation proceeds to STEP S417 in which the CPU 11 generates print preview display image data. Then, the operation proceeds to STEP S419. Meanwhile, in a case where the data size of the print preview display image data corresponding to the current direction of the portable phone is larger than the data size of the print preview display image data corresponding to the changed direction (YES in STEP S415), the operation proceeds to STEP S416. In STEP S416, the CPU 11 generates the print preview display image data corresponding to the changed direction, on the basis of the print preview display image data corresponding to the current direction. In STEP S416 and STEP S417, a process of fixing the direction of the portable phone 10 is performed before the generation of the print preview display image data, and a process of releasing the fixing of the direction of the portable phone 10 is performed after the generation of the print preview display image data. The detailed contents of the process of fixing the direction of the portable phone 10 is the same as the contents of the process of STEP S123 or STEP S125 (FIG. 3), and the detailed contents of the process of releasing the fixing are the same as the contents of the process of STEP S131 (FIG. 3). Thus, the redundant description will not be repeated.

In STEP S419, the CPU 11 stores the generated current print preview display image data in the image data storage area 12b. The detailed process contents of STEP S419 are the same as the process contents of STEP S237 (FIG. 8), and thus the redundant description will not be repeated. In STEP S420, the CPU 11 determines whether the direction of the portable phone 10 has been changed. In a case where the direction of the portable phone 10 has been changed (YES in STEP S420), the operation returns to STEP S413, and in a case where the direction of the portable phone 10 has not been changed (NO in STEP S420), the operation proceeds to STEP S421. In STEP S421, the CPU 11 displays the print preview display image based on the print preview display image data corresponding to the changed direction.

In STEP S423, the CPU 11 determines whether there is image data having the next identification number 300. In a case where there is image data having the next identification number 300 (YES in STEP S423), the operation returns to STEP S215, and in a case where there is no image data having the next identification number 300 (NO in STEP S423), the operation proceeds to STEP S425. In STEP S425, the CPU 11 acquires a file path for accessing the image data having the next identification number 300.

In STEP S427, the CPU 11 determines whether there is any print preview display image data, corresponding to the changed direction of the portable phone 10, already stored with respect to the image data accessed in STEP S425. In a case where it is determined that there is corresponding print preview display image data (YES in STEP S427), the operation proceeds to STEP S423, and in a case where it is determined that there is no corresponding print preview display image data (NO in STEP S427), the operation proceeds to STEP S429. In STEP S429, the CPU 11 generates print preview display image data. In STEP S413, the CPU 11 stores the generated current print preview display image data, in the image data storage area 12b. In STEP S432, the CPU 11 determines whether any switch instruction for switching the print preview display image displayed on the panel 18 has been input. In a case where a switch instruction has been input (YES in STEP S432), the operation returns to STEP S420, and in a case where any switch instruction has not been input (NO in STEP S432), the operation returns to STEP S423.

The effects of the print application 21a according to the fourth embodiment will be described. According to the print application 21a, even if the direction of the portable phone 10 is changed when a print preview display image is being displayed, it is possible to regenerate a print preview display image according to the changed posture of the portable phone 10 from the currently displayed print preview display image.

Further, even if the direction of the portable phone 10 is changed when a print preview display image is being displayed, it is possible to regenerate a print preview display image according to the changed direction of the portable phone 10, sequentially from a print preview display image item which is likely to be subsequently displayed (a print preview display image having the next identification number 300 of the identification number 300 of the currently displayed print preview display image). Therefore, it is possible to reduce the waiting time of the user until a print preview display image is redisplayed.

Fifth Embodiment

A fifth embodiment will be described. The fifth embodiment relates to an operation after generation of print preview display image data is completed. The fifth embodiment is a modification of the operation of the print application 21a according to the fourth embodiment. A communication system used in the fifth embodiment is the same as the communication system 1 (FIG. 1) according to the first embodiment, and thus the redundant description will not be repeated.

Figure 12:
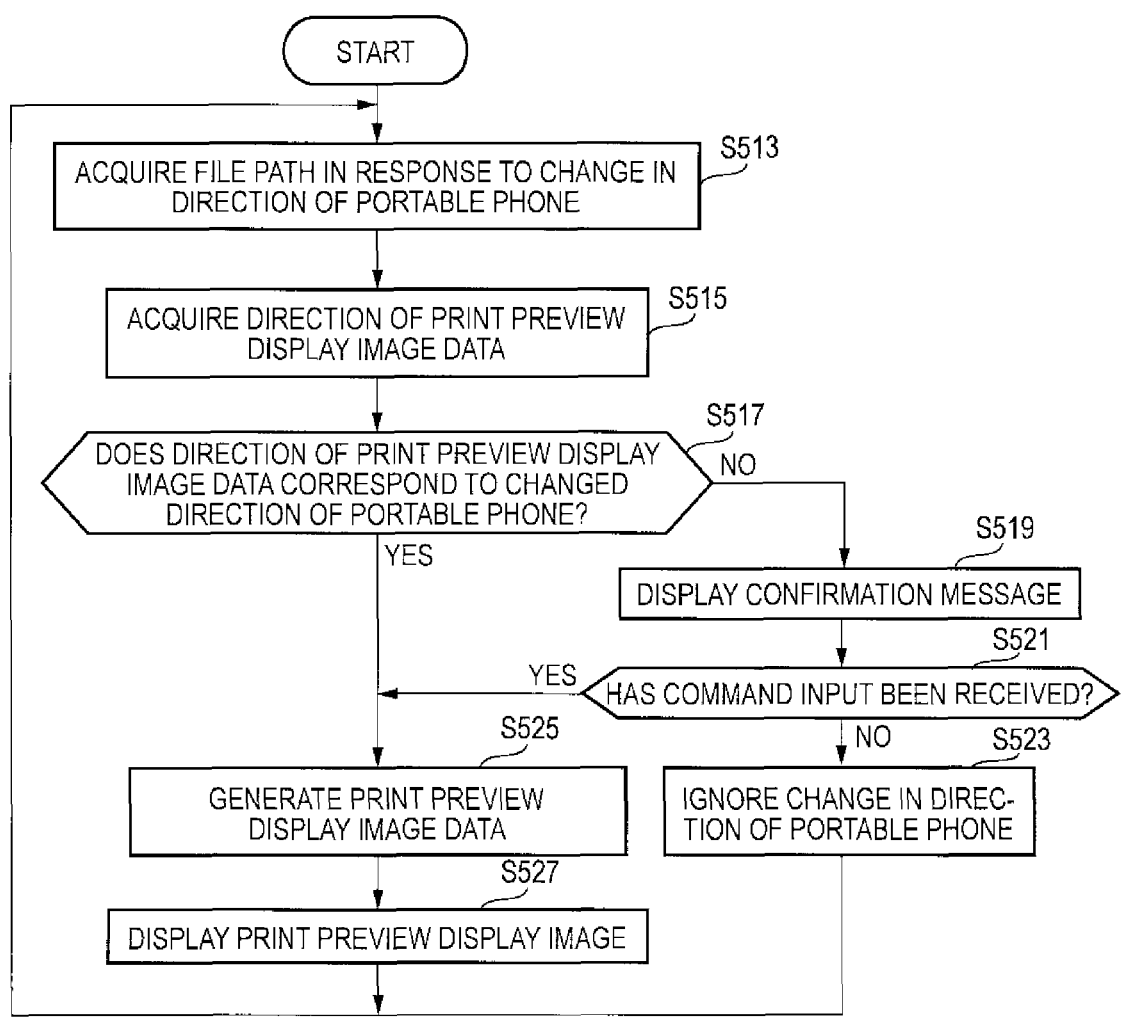
FIG. 12 is a flowchart illustrating an operation of another print application.

The flow of FIG. 12 starts after the generation of the plural pieces of print preview display image data is completed according the flows of the follows of the first to third embodiments, or the like. In STEP S513, the CPU 11 acquires a file path for accessing the current displayed print preview display image data, if it is determined that the direction of the portable phone 10 has been changed. In STEP S515, the CPU 11 acquires the direction of the image data which is the source of the print preview display image data. For example, in a case where the format of the image data corresponds to the Exif format, the direction of the image data which is the source of the print preview display image data may be read from metadata added to the image data.

In STEP S517, the CPU 11 determines whether the direction (the vertical direction or the horizontal direction) of the print preview display image data acquired in STEP S515 corresponds to the direction (the vertical direction or the horizontal direction) of the changed direction of the portable phone 10. In a case where the direction of the print preview display image data acquired in STEP S515 corresponds to the direction of the changed direction of the portable phone 10 (YES in STEP S517), the operation proceeds to STEP S525, and in a case where the direction of the print preview display image data acquired in STEP S515 does not correspond to the direction of the changed direction of the portable phone 10 (NO in STEP S517), the operation proceeds to STEP S519.

In STEP S519, the CPU 11 displays a confirmation message asking whether to display the print preview display image corresponding to the changed direction of the portable phone 10, on the panel 18. Further, the CPU 11 receives a command input for displaying the print preview display image corresponding to the changed direction. In STEP S521, the CPU 11 determines whether any command input has been received. In a case where any command input has not been received (NO in STEP S521), the operation proceeds to STEP S523 in which the CPU 11 ignores the change in direction of the portable phone 10. Then, the operation returns to STEP S513. The detailed contents of the process of ignoring the change in direction of the portable phone 10 is the same as the contents of the process of STEP S241 (FIG. 8) of the second embodiment, and thus the redundant description will not be repeated.

Meanwhile, in a case where a command input has been received (YES in STEP S521), the operation proceeds to STEP S525. In STEP S525, the CPU 11 generates the print preview display image data. Further, in STEP S525, a process of fixing the direction of the portable phone 10 is performed before the generation of the print preview display image data, and a process of releasing the fixing of the direction of the portable phone 10 is performed after the generation of the print preview display image data. In STEP S527, the CPU 11 displays the print preview display image based on the print preview display image data corresponding to the changed direction. Then, the operation returns to STEP S513.

The effects of the print application 21a according to the fifth embodiment will be described. In the case where the changed direction of the portable phone 10 does not correspond to the direction of the print preview display image data, it can be considered that it is highly possible that the user unintentionally erroneously changed the direction of the portable phone 10. For this reason, in a case where a command input regarding whether to generate the print preview display image data corresponding to the changed direction of the portable phone 10 is received, the CPU 11 generates the print preview display image data according to the changed direction of the portable phone 10. Therefore, even in the case where the user unintentionally changed the direction of the portable phone 10, since the process of regenerating the print preview display image data is not immediately started, it is possible to efficiently perform the process of displaying the print preview display image data.

The embodiments have been described above; however, the embodiments are mealy examples, and do not limit the scope of claims. The technologies described in the scope of claims include various changes and modifications of the exemplified embodiments. Modifications of the embodiments will be exemplified below.

Modifications

In the embodiments, a case where the CPU 11 performs various processes on the basis of the print application 21a has been described. However, the present invention is not limited thereto. As a modification, as will be described below, on the basis of the print application 21a, the CPU 11 may output instructions for instructing the operating system 21e, other programs, or a hardware component (such as the panel 18) to perform various processes.

On the basis of a process performed by the operating system 21e, the CPU 11 may perform a process of reading image data. In this case, for example, in STEP S11, the CPU 11 (based on the gallery application 21c) may output an instruction for instructing the process of reading image data, to the operating system 21e.

The CPU 11 may perform various determinations on the basis of processes performed by the operating system 21e. In this case, for example, in STEP S13, the CPU 11 (based on the gallery application 21c) may output an instruction for instructing a determination process, to the operating system 21e.

The CPU 11 may acquire or store image data on the basis of the processes performed by the operating system 21e. In this case, for example, in STEP S127, the CPU 11 (based on the print application 21a) may output an instruction for instructing the operating system 21e to acquire image data and store the image data in the storage unit 12, to the operating system 21e.

The CPU 11 may generates a print preview display image data (according to the posture of the portable phone 10), on the basis of processes performed by the operating system 21e. In this case, for example, in STEP S128, the CPU 11 (based on the print application 21a) may output an instruction for instructing the operating system 21e to generate a print preview display image data according to the direction of the portable phone 10 acquired in STEP S119, on the basis of the image data acquired in STEP S217, to the operating system 21e.

The CPU 11 may make the panel 18 display a print preview display image on the basis of the processes performed by the operating system 21e. In this case, for example, in STEP S133, the CPU 11 (based on the print application 21a) may output an instruction for displaying a print preview display image on the panel 18, to the operating system 21e.

In the embodiments, a case where the CPU 11 generates the print preview display image data on the basis of the print application 21a (preview display image generating program) has been described. In other words, a case where the CPU 11 operates by the print application 21a has been described. However, the present invention is not limited thereto. For example, the CPU 11 may generate print preview display image data on the basis of a preview display image generating program of the operating system 21e. In this case, the print application 21a may output an instruction for generating a preview display image, and the API may generate a preview display image on the basis of the instruction. Alternatively, for example, a preview display image generating circuit may generate print preview display image data. In this case, the portable phone 10 may include a hardware component like the preview display image generating circuit. Further, the print application 21a may output an instruction for generating a preview display image, and the preview display image generating circuit generates a preview display image on the basis of the instruction.

The processes performed by the CPU 11 in STEP S329 of the third embodiment is not limited to the thinning and reduction processes. For example, in a case where the data size of the print preview display image data corresponding to the direction different from the current direction of the portable phone 10 is smaller than the data size of the print preview display image data corresponding to the current direction of the portable phone 10, the CPU 11 may perform an enlargement process based on pixel interpolation, on the print preview display image data having the smaller data size.

The method of acquiring image data in STEPS S114 and S127 of the first embodiment or the like is not limited to the sharing of image data. Image data may be acquired by a process of reading the image data from the storage unit 12 (such as an SD card).

In the first embodiment, in the case where it is determined in STEP S115 that there is plural pieces of image data to be shared with the gallery application 21c, the direction of the portable phone 10 is fixed (STEP S123 or S125). However, the present invention is not limited thereto. Even in a case where there is one piece of image data, for example, if the data size of the image data is large or the process takes a long time, the direction of the portable phone 10 may be fixed.

The process of fixing the direction of the portable phone 10 may be performed in various forms. For example, as in STEP S241 of the second embodiment, the direction of the portable phone 10 may be fixed by ignoring information on the direction of the portable phone 10 received from the operating system 21e.

Figure 2:
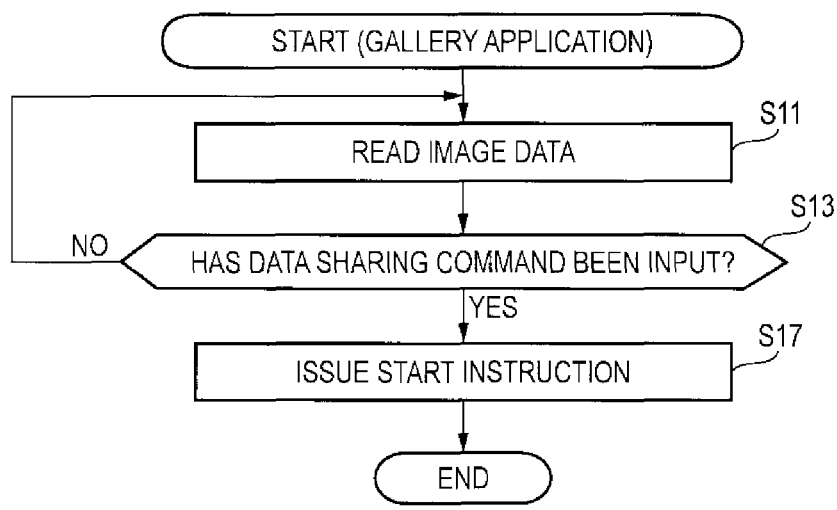
FIG. 2 is a flow chart illustrating an operation of a gallery application.
Figure 3:
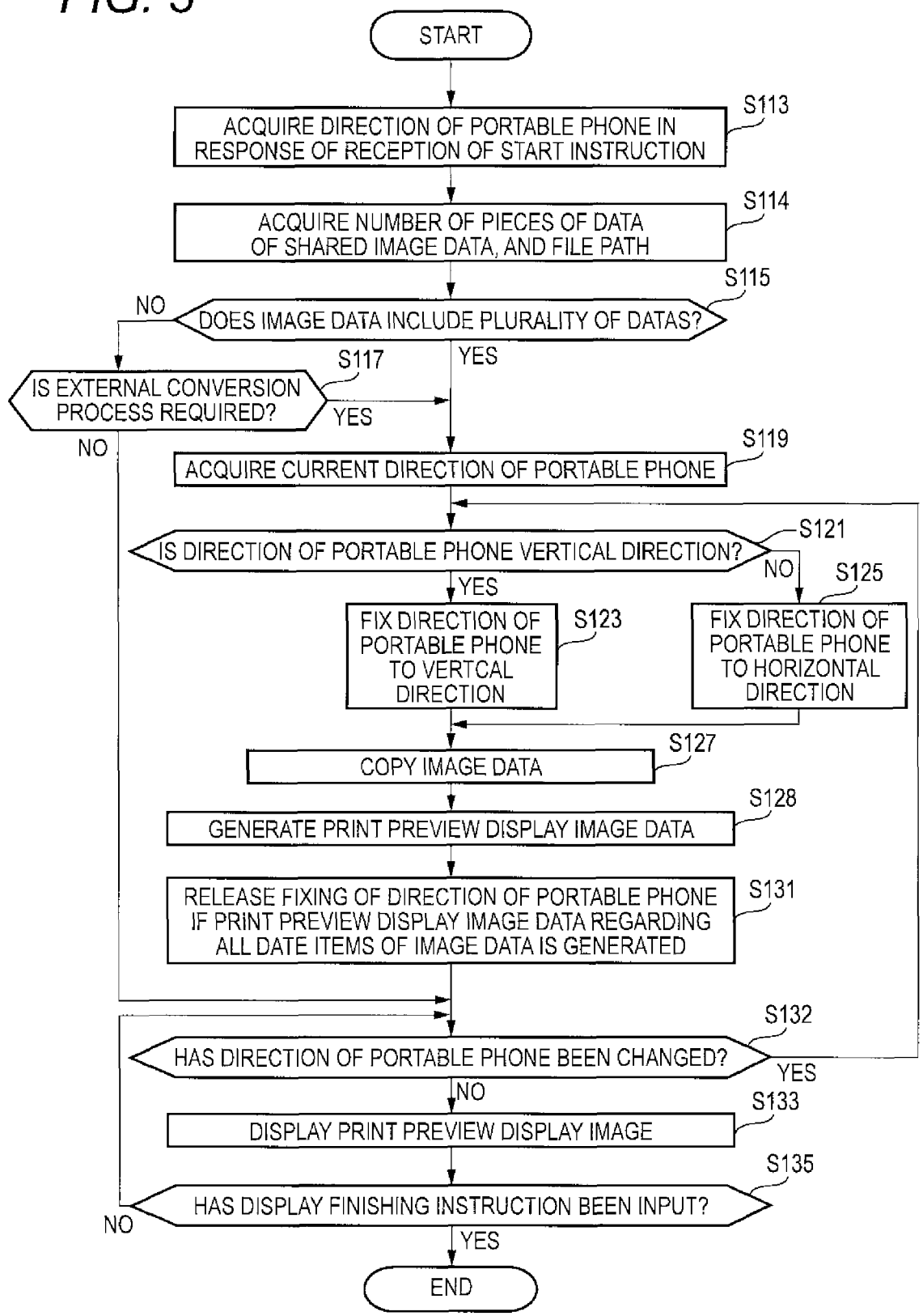
FIG. 3 is a flow chart illustrating an operation of a print application.

The start instruction received by the CPU 11 in STEP S113 (FIG. 3) is not limited to the start instruction issued in STEP S17 (FIG. 2). For example, the start instruction may be a start instruction based on an input by the user, such as clicking on an icon displayed on the panel 18 according to the print application 21a.

In STEP S113, the CPU 11 may acquire the direction of the portable phone 10 detected by the tilt sensor 29, on the basis of the print application 21a, without involvement of the operating system 21e, and store the direction of the portable phone 10 in the storage unit 12.

In STEP S132 (FIG. 3), the determination on whether the direction of the portable phone 10 has been changed may be performed according to the following modification. First, on the basis of the print application 21a, whenever the direction of the portable phone 10 is regularly notified from the operating system 21e, the CPU 11 may determines whether the notified direction of the portable phone 10 is different from the direction of the portable phone 10 acquired in STEP S119, thereby determining whether the direction has been changed.

In STEP S325 (FIG. 9), a case of performing a determination based on the data size of the print preview display image data has been described; however, the present invention is not limited thereto. For example, the determination may also be performed on the basis of the size of a preview display area.

In the fourth embodiment, STEPS S423 to S431 (FIG. 11) may be omitted. In this case, with respect to the current displayed print preview display image, it is possible to display a print preview display image according to the current direction of the portable phone.

In the fourth embodiment, STEP S432 may also be omitted. Therefore, it is possible to display a plurality of print preview display images on one screen. In this case, after the process of STEP S431 is performed, the operation returns to STEP S420, and a generated print preview display image is sequentially displayed on the same screen in STEP S421.

In the fifth embodiment, STEPS S519 to S521 (FIG. 12) may be omitted. In this case, in the case where it is determined that the direction of the print preview display image data does not correspond to the changed direction of the portable phone 10 (NO in STEP S517), the CPU 11 performs the process of ignoring the change in direction of the portable phone 10 in STEP S523.

The technical elements described in the specification or the drawings can exhibit technical usefulness, either alone or in combination, and combinations are not limited to those described in the claims as filed. The techniques illustrated in the specification or the drawings can achieve a plurality of purposes at the same time, and achieving only one of them has technical usefulness.

Claims are described using the expression of instruction that causes a unit to perform a curtain process, such as an acquisition control instruction, a generation control instruction, a display control instruction, and a storage control instruction. Here, a description 'causing a curtain unit to perform various process' does not necessarily express only that a computer (such as the CPU 11) performs various processes on the basis of an image processing program (such as the print application 21a). The description includes a format in which the computer outputs instructions for instructing various processes to an operating system and hardware components (such as the panel 18).

Each unit (such as the generating unit, the display unit, the first acquiring unit, the second acquiring unit, the first storing unit, the second storing unit, the first receiving unit, and the second receiving unit) may be hardware and a means implemented by execution of a driver in a program according to the present invention or the operating system 21e or another program, or only hardware. The driver may be a collection of a plurality of programs.

According to the image processing program, in a case of making the computer function as each means, it is possible to make the generating unit generate the display image data on the posture of the information processing terminal device during the start of the generation of the display image data, until the generation of the display image data by the generating unit is completed. Therefore, even if the user unintentionally changes the posture of the information terminal device during the process of generating the display image data, it is possible to prevent a process of generating a display image data according to the changed posture of the information processing terminal device from being performed from the beginning. As result, the information processing terminal device can receive a user's manipulation even before the process of generating the display image data before a process of generating a display image data is completed, and it is possible to prevent an increase in a waiting time until the display image data is displayed.

Further, it is possible to make image data shared between an application program and the image processing program. Therefore, it is possible to make the first acquiring unit acquire one or more pieces of image data by sharing the image data.

According to the image processing program, the acquisition control unit may make the first acquiring unit and the storing unit perform a process of acquiring the image data and a process of storing the image data. If the acquiring process and the storing process are performed as described above, the time required for the process becomes longer, as compared to a case of performing only the acquiring process. However, according to the image processing program, for example, even in a case where the user unintentionally change the posture of the information processing terminal device while the acquiring process and the storing process are being processed, it is possible to prevent the acquiring process and the storing process from being reperformed from the beginning. Therefore, it is possible to prevent an increase in the waiting time until a display image data is displayed.

In a case where there the first acquiring unit acquires a plural piece of image data, the time required for the process becomes longer, as compared to a case of acquiring only one piece of image data. However, according to the image processing program, for example, even in a case where the user unintentionally change the posture of the information processing terminal device while the acquiring process and the storing process are being processed, it is possible to prevent the acquiring process and the storing process from being reperformed from the beginning. Therefore, it is possible to prevent an increase in the waiting time until a display image data is displayed.

Further, according to the image processing program, if a display image data is generated once, since the display image data is stored, it is possible to avoid the trouble of having to regenerate the corresponding display image data. Therefore, it is possible to display the display image data more quickly, and to improve the convenience for the user.

Moreover, according to the image processing program, even in a case where the posture of the information processing terminal device is changed while a display image data is generated, it is possible to prevent the process of generating a display image data from being reperformed from the beginning. Therefore, it is possible to prevent an increase in the waiting time until a display image data is displayed.

Moreover, according to the image processing program, it is possible to regenerate a display image data from the already generated display image data. Therefore, it is possible to display the display image data more quickly.

Also, according to the image processing program, even in a case where the posture of the information processing terminal device is changed while display image data is being displayed, it is possible to regenerate display image data according to the changed posture of the information processing terminal device, from the currently displayed display image data.

Further, according to the image processing program, even in a case where the posture of the information processing terminal device is changed while display image data is being displayed, it is possible to regenerate display image data according to the changed posture of the information processing terminal device, sequentially from display image data which is likely to be subsequently displayed (display image data having a number close to the currently displayed display image data). Therefore, it is possible to prevent an increase in the waiting time until display image data is redisplayed.

According to the image processing program, in a case where the direction of the information processing terminal device determined by the changed posture of the information processing terminal device corresponds to the direction of the display image data, it can be considered that it is highly possible that the user intentionally changed the direction of the information processing terminal device. In this case, according to the information processing program, an instruction for instructing generation of display image data according to the changed posture of the information processing terminal device may be output to the generating unit. Therefore, it is possible to effectively perform a process of displaying the image data.

In a case where the direction of the information processing terminal device determined by the changed posture of the information processing terminal device does not correspond to the direction of the display image data, it can be considered that it is highly possible that the user unintentionally and erroneously changed the direction of the information processing terminal device. In this case, according to the image processing program, display image data according to the changed posture of the information processing terminal device may be generated in a case where a command input regarding whether to generate the display image data according to the changed posture of the information processing terminal device is received by a receiving unit. Therefore, even in the case where the user unintentionally changes the posture of the information processing terminal device, since the process of regenerating the display image data is not immediately started, it is possible to effectively perform a process of displaying the display image data.

What is claimed is:

1. An information processing mobile terminal device comprising:
   a display configured to display an image;
   a sensor configured to output posture information indicative of a posture of the information processing mobile terminal device, the posture information indicating which posture that the information processing mobile terminal device is positioned in, between a vertical posture and a horizontal posture;
   wherein, in the vertical posture, a long side of a surface where the display is disposed is vertical, and in the horizontal posture, the long side of the surface is horizontal;
   a communication interface configured to communicate with a printing apparatus;
   a user interface; and
   a processor configured to:
      receive a display instruction instructing the display to display a print preview image based on image data selected through the user interface, wherein the print preview image does not influence an orientation of an image that is printed in the printing apparatus when the processor receives a print instruction in a state where the print preview image is displayed on the display, generate print data for printing an image based on the selected image data, and transmit the generated print data to the printing apparatus;
      in response to receiving the display instruction, start generating first print preview image data indicative of a first print preview image applied to a posture of the display in a state where the information processing mobile terminal device is in a first posture, based on a selected image data, the first posture being indicated by the posture information output from the sensor, the first posture being one of the vertical posture and the horizontal posture, the display being disposed on a body of the information processing mobile terminal device, the display being in the same posture oriented with the posture of the information processing mobile terminal device, the first posture being a posture of the information processing terminal device when the display instruction is received;
      display the first print preview image based on the generated first print preview image data, on the display if the process of generating the first print preview image data is completed in a state where the posture of the information processing mobile terminal device and the display are maintained to be in the first posture;
      in response to determining that the sensor outputs the posture information indicating that the posture of the information processing mobile terminal device changes from the first posture to a second posture different from the first posture, continue generating the first print preview image data without canceling generation of the first print preview image data even if the posture of the information processing mobile terminal device changes from the first posture to the second posture while the first print preview image data is being generated;
      in response to determining that the posture of the mobile terminal device changes from the first posture to the second posture, generate second print preview image data indicative of a second print preview image applied to a posture of the display in a state where the information processing mobile terminal device is in the second posture, based on the selected image data, the second posture being another one of the vertical posture and the horizontal posture, wherein the posture of the display changes from the first posture to the second posture as the posture of the information processing mobile terminal device changes from the first posture to the second posture;
      in response to completing the process of generating the first print preview image data, display, in a state where the information processing mobile terminal device and the display are in the second posture, the first print preview image based on the generated first print preview image data, on the display, and thereafter, in response to completing the process of generating the second print preview image data and determining that the posture of the mobile terminal device had changed from the first posture to the second posture while the first print preview image data was being generated, display, in the same state where the information processing mobile terminal device and the display are in the second posture, the second print preview image based on the generated second print preview image data, on the display;
      in a state where the first print preview image is displayed on the display, receive, through the user interface, a print instruction, generate print data for printing an image having a first orientation based on the selected image data, and transmit the generated print data to the printing apparatus; and
      in a state where the second print preview image is displayed on the display, receive, through the user interface, a print instruction, generate print data for printing an image having the first orientation based on the selected image data, and transmit the generated print data to the printing apparatus.

2. The information processing terminal device according to claim 1 further comprising a program storing unit configured to store an application program,
   wherein the processor is configured to acquire the image data selected through the user interface from the application program in response to receiving the display instruction.

3. The information processing terminal device according to claim 1, wherein, if a plurality of pieces of the image data are acquired, the processor is configured to complete the process of generating the first print preview image data for all of the acquired pieces of the image data, on the basis of the first posture of the information processing terminal device at the start time of the generation of the first print preview image data.

4. The information processing terminal device according to claim 1, wherein
a storing unit is configured to store the generated first print preview image data and the generated second print preview image data,
in a case where the storing unit does not store the second print preview image data according to the second posture of the information processing terminal device detected by the sensor and stores the first print preview image data according to the first posture detected by the sensor, the processor is configured to generate the second print preview image data according to the second posture of the information processing terminal device detected by the sensor, based on the first print preview image data according to the first posture.

5. The information processing terminal device according to claim 1, wherein
a storing unit is configured to store the generated first print preview image data according to the first posture of the information processing terminal device, and
the processor is configured to generate the second print preview image data based on the first print preview image data.

6. The information processing terminal device according to claim 1, wherein the processor is configured to reduce the first print preview image data to generate the second print preview image data.

7. The information processing terminal device according to claim 1, wherein the processor is configured to enlarge the first print preview image data to generate the second print preview image data.

8. The information processing terminal device according to claim 1, wherein in a case that the selected image data is data which should be processed and converted by an external device, the processor is configured to continue generating the first print preview image data without canceling the generation of the first print preview image data even if the information processing terminal device is changed from the first posture to the second posture while the first print preview image data is being generated.

9. A non-transitory computer readable recording medium storing an image processing program comprising computer-readable instructions to be executed by a computer of an information processing mobile terminal device including a display configured to display an image, a sensor configured to output posture information indicative of a posture of the information processing mobile terminal device, the posture information indicating which posture that the information processing mobile terminal device is positioned in, between a vertical posture and a horizontal posture,
and wherein, in the vertical posture, a long side of a surface where the display is disposed is vertical, and in the horizontal posture, the long side of the surface is horizontal, the information processing mobile terminal device further including a communication interface configured to communicate with a printing apparatus, and a user interface, the computer-readable instructions comprising:
a first receiving instruction of receiving a display instruction instructing the display to display a print preview image based on image data selected through the user interface, wherein the print preview image does not influence an orientation of an image that is printed in the printing apparatus when the information processing mobile terminal device receives a print instruction in a state where the print preview image is displayed on the display, generate print data for printing an image based on the selected image data, and transmit the generated print data to the printing apparatus;
a first generating instruction in response to receiving the display instruction of starting generating first print preview image data indicative of a first print preview image applied to a posture of the display in a state where the information processing mobile terminal device is in a first posture, based on a selected image data, the first posture being indicated by the posture information output from the sensor, the first posture being one of the vertical posture and the horizontal posture, the display being disposed on a body of the information processing mobile terminal device, the display being in the same posture oriented with the posture of the information processing mobile terminal device, the first posture being a posture of the information processing terminal device when the display instruction is received;
a first displaying instruction to display the first print preview image based on the generated first print preview image data, on the display if the process of generating the first print preview image data is completed in a state where the posture of the information processing mobile terminal device and the display are maintained to be in the first posture,
wherein, in response to determining that the sensor outputs the posture information indicating that the posture of the information processing mobile terminal device changes from the first posture to a second posture different from the first posture, the first generating instruction continues generating the first print preview image data without canceling generation of the first print preview image data even if the posture of the information processing mobile terminal device changes from the first posture to the second posture while the first print preview image data is being generated; and
a second generating instruction of generating second print preview image data indicative of a second print preview image applied to a posture of the display in a state where the information processing mobile terminal device is in the second posture, based on the selected image data, the second posture being another one of the vertical posture and the horizontal posture, the posture of the display changes from the first posture to the second posture as the posture of the information processing mobile terminal device changes from the first posture to the second posture;
wherein, in response to completing the process of generating the first print preview image data, display, in a state where the information processing mobile terminal device and the display are in the second posture, the first print preview image based on the generated first print preview image data, on the display, and thereafter, in response to completing the process of generating the second print preview image data and determining that the posture of the mobile terminal device had changed from the first posture to the second posture while the first print preview image data was being generated, display, in the same state where the information processing mobile terminal device and the display are in the second posture, the second print preview image based on the generated second print preview image data, on the display;

wherein, in a state where the first print preview image is displayed on the display, a second receiving instruction of receiving, through the user interface, a print instruction, generate print data for printing an image having a first orientation based on the selected image data, and transmit the generated print data to the printing apparatus; and wherein, in a state where the second print preview image is displayed on the display, receive, through the user interface, a print instruction, generate print data for printing an image having the first orientation based on the selected image data, and transmit the generated print data to the printing apparatus.

10. The non-transitory computer readable recording medium according to claim 9, wherein the information processing terminal device further includes a program storing unit configured to store an application program, the image data selected through the user interface is acquired from the application program.

11. The non-transitory computer readable recording medium according to claim 9, wherein, if a plurality of pieces of the image data are acquired, the program causes the computer to complete the process of generating the first preview image data for all of the acquired pieces of the image data, on the basis of the first posture of the information processing terminal device at the start time of the generation of the first preview image data.

12. The non-transitory computer readable recording medium according to claim 9, wherein the information processing terminal device includes a storing unit configured to store the generated first print preview image data and the generated second print preview image data, in a case where the storing unit does not store the second preview image data according to the second posture of the information processing terminal device detected by the sensor and stores the first preview image data according to the first posture detected by the sensor, the program causes the computer to generate the second preview image data according to the second posture of the information processing terminal device detected by the sensor, based on the first preview image data according to the first posture.

13. The non-transitory computer readable recording medium according to claim 9, wherein the information processing terminal device includes a storing unit configured to store the generated first print preview image data according to the first posture of the information processing terminal device, and the computer-readable instructions further includes an instruction causing the computer to generate the second print preview image data based on the first print preview image data.

14. The non-transitory computer readable recording medium according to claim 9, wherein the computer-readable instructions further includes an instruction causing the computer to reduce the first print preview image data to generate the second print preview image data.

15. The non-transitory computer readable recording medium according to claim 9, wherein the computer-readable instructions further includes an instruction causing the computer to enlarge the first print preview image data to generate the second print preview image data.

16. The non-transitory computer readable recording medium according to claim 9, wherein in a case that the selected image data is data which should be processed and converted by an external device, the computer-readable instructions further includes an instruction causing the computer to continue generating the first print preview image data without canceling the generation of the first print preview image data even if the information processing terminal device is changed from the first posture to the second posture while the first print preview image data is being generated.

17. The non-transitory computer readable recording medium according to claim 9, wherein the first generating instruction causes the computer to instruct an operation system installed in the information processing terminal device to generate the first print preview image data, thereby the computer starts generating the first print preview image data.

18. The non-transitory computer readable recording medium according to claim 9, wherein the second generating instruction causes the computer to instruct an operation system installed in the information processing terminal deice to generate the second print preview image data, thereby the computer starts generating the second print preview image data.

19. The non-transitory computer readable recording medium according to claim 9, wherein the computer-readable instructions includes instruction detect the posture of the information processing terminal device by acquiring the posture information output from the sensor through an operation system installed in the information processing terminal device.

20. The non-transitory computer readable recording medium according to claim 9, wherein the first generating instruction does not refer to the posture information output from the sensor during the generation of the first print preview image data started by the first generating instruction, thereby the first generating instruction continues generating the first print preview image data without canceling generation of the first print preview image data.

* * * * *